(12) United States Patent
Fong et al.

(10) Patent No.: US 8,681,149 B2
(45) Date of Patent: Mar. 25, 2014

(54) 3D LAYERING OF MAP METADATA

(71) Applicant: Microsoft Corporation, Redmond, WA (US)

(72) Inventors: Jeffrey Cheng-Yao Fong, Seattle, WA (US); Donald A. Barnett, Monroe, WA (US); Eric Neal Braff, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/683,994

(22) Filed: Nov. 21, 2012

(65) Prior Publication Data

US 2013/0083017 A1 Apr. 4, 2013

Related U.S. Application Data

(63) Continuation of application No. 12/842,880, filed on Jul. 23, 2010, now Pat. No. 8,319,772.

(51) Int. Cl.
*G06T 15/00* (2011.01)

(52) U.S. Cl.
USPC .......................................... 345/419

(58) Field of Classification Search
None
See application file for complete search history.

(56) References Cited

U.S. PATENT DOCUMENTS

| 4,914,605 | A | 4/1990 | Loughmiller et al. |
|---|---|---|---|
| 5,467,444 | A | 11/1995 | Kawamura et al. |
| 5,508,930 | A | 4/1996 | Smith, Jr. |
| 5,555,354 | A | 9/1996 | Strasnick et al. |
| 5,802,492 | A | 9/1998 | DeLorme et al. |
| 6,321,158 | B1 | 11/2001 | DeLorme et al. |
| 6,334,087 | B1 | 12/2001 | Nakano et al. |
| 6,430,501 | B1 | 8/2002 | Slominski |
| 6,484,092 | B2 | 11/2002 | Seibel |
| 6,650,326 | B1 | 11/2003 | Huber et al. |

(Continued)

FOREIGN PATENT DOCUMENTS

| CN | 1349202 | 5/2002 |
|---|---|---|
| CN | 1609913 | 4/2005 |

(Continued)

OTHER PUBLICATIONS

Dorn et al., "Designing a User Interface for a PDA-Based Campus Navigation Device," *Proc. of the Human Factors and Ergonomics Society*, pp. 861-865 (Sep. 2004).

(Continued)

*Primary Examiner* — Edward Martello
(74) *Attorney, Agent, or Firm* — Aaron Chatterjee; Andrew Sanders; Micky Minhas

(57) ABSTRACT

Techniques and tools are described for rendering views of a map in which map metadata elements are layered in 3D space through which a viewer navigates. Layering of metadata elements such as text labels in 3D space facilitates parallax and smooth motion effects for zoom-in, zoom-out and scrolling operations during map navigation. A computing device can determine a viewer position that is associated with a view altitude in 3D space, then render for display a map view based upon the viewer position and metadata elements layered at different metadata altitudes in 3D space. For example, the computing device places text labels in 3D space above features associated with the respective labels, at the metadata altitudes indicated for the respective labels. The computing device creates a map view from points of the placed labels and points of a surface layer of the map that are visible from the viewer position.

20 Claims, 11 Drawing Sheets

(56) References Cited

U.S. PATENT DOCUMENTS

| | | |
|---|---|---|
| 6,785,667 B2 | 8/2004 | Orbanes et al. |
| 6,826,472 B1 | 11/2004 | Kamei et al. |
| 6,865,480 B2 | 3/2005 | Wong |
| 6,956,590 B1 | 10/2005 | Barton et al. |
| 6,972,757 B2 | 12/2005 | Arikawa et al. |
| 7,336,274 B2 | 2/2008 | Kida |
| 7,353,114 B1 | 4/2008 | Rohlf et al. |
| 7,430,473 B2 | 9/2008 | Foo et al. |
| 7,737,951 B2 | 6/2010 | Pinkus et al. |
| 7,788,028 B2 | 8/2010 | Matsuoka et al. |
| 7,796,139 B1 | 9/2010 | Feierbach et al. |
| 7,925,438 B2 | 4/2011 | Lo |
| 7,933,929 B1 | 4/2011 | McClendon et al. |
| 8,319,772 B2 | 11/2012 | Fong et al. |
| 2002/0042674 A1 | 4/2002 | Mochizuki et al. |
| 2003/0078729 A1 | 4/2003 | Ohdachi et al. |
| 2003/0229441 A1 | 12/2003 | Pechatnikov et al. |
| 2004/0024524 A1 | 2/2004 | Miyazawa |
| 2004/0158393 A1 | 8/2004 | Oonishi et al. |
| 2005/0083325 A1 | 4/2005 | Cho |
| 2005/0140676 A1 | 6/2005 | Cho |
| 2006/0174209 A1 | 8/2006 | Barros |
| 2007/0096945 A1 | 5/2007 | Rasmussen et al. |
| 2007/0132767 A1 | 6/2007 | Wright et al. |
| 2007/0176796 A1 | 8/2007 | Bliss et al. |
| 2007/0229538 A1 | 10/2007 | Klassen et al. |
| 2008/0040024 A1 | 2/2008 | De Silva |
| 2008/0167811 A1 | 7/2008 | Geelen |
| 2008/0228386 A1 | 9/2008 | Geelen et al. |
| 2008/0243374 A1 | 10/2008 | Hatazawa |
| 2009/0037094 A1 | 2/2009 | Schmidt |
| 2009/0046093 A1 | 2/2009 | Kikuchi et al. |
| 2009/0112462 A1 | 4/2009 | Lo |
| 2009/0171559 A1 | 7/2009 | Lehtiniemi et al. |
| 2009/0177383 A1 | 7/2009 | Tertoolen |
| 2009/0227268 A1 | 9/2009 | Sorensson et al. |
| 2009/0234567 A1 | 9/2009 | Lee |
| 2010/0179005 A1 | 7/2010 | Meadows et al. |
| 2010/0198497 A1 | 8/2010 | Okuno |
| 2011/0066364 A1 | 3/2011 | Hale |
| 2011/0077851 A1 | 3/2011 | Ogawa et al. |
| 2011/0184642 A1 | 7/2011 | Rotz et al. |
| 2011/0313662 A1 | 12/2011 | Huang et al. |
| 2012/0019513 A1 | 1/2012 | Fong et al. |
| 2012/0150436 A1 | 6/2012 | Rossano et al. |
| 2013/0069941 A1 | 3/2013 | Augui et al. |

FOREIGN PATENT DOCUMENTS

| | | |
|---|---|---|
| EP | 1526502 A2 | 4/2005 |
| EP | 2068121 | 6/2009 |
| KR | 10-2000-0062510 | 10/2000 |

OTHER PUBLICATIONS

International Search Report, PCT Application No. PCT/US2011/044582, Feb. 21, 2012.

Microsoft Corporation, "Accessing the Bing Maps REST Services Using PHP," 18 pp., MSDN Library ff817004 (document captured and timestamped Aug. 7, 2012).

Microsoft Corporation, "Accessing the Bing Maps SOAP Services Using PHP," 28 pp., MSDN Library ff714580 (document captured and timestamped May 13, 2012).

Microsoft Corporation, "Accessing the Bing Spatial Data Services Using PHP," 9 pp, MSDN Library ff817006 (document captured and timestamped Aug. 7, 2012).

Microsoft Corporation, "Bing Maps AJAX Control Articles," 3 pp., MSDN Library cc879134 (document captured and timestamped May 14, 2012).

Microsoft Corporation, "Bing Maps Articles," 4 pp., MSDN Library bb545001 (document captured and timestamped May 14, 2012).

Microsoft Corporation, "Bing Maps SOAP Services Articles," 2 pp., MSDN Library cc879135 (document captured and timestamped May 13, 2012).

Microsoft Corporation, "Bing Maps Tile System," 11 pp., MSDN Library bb259689 (document captured and timestamped Jul. 9, 2012).

Microsoft Corporation, "Bing Spatial Data Services," 2 pp., MSDN Library ff701734 (document captured and timestamped May 19, 2012).

Microsoft Corporation, "Calculating a Route Using Bing Maps SOAP Services," 14 pp., MSDN Library ee681887 (document captured and timestamped May 14, 2012).

Microsoft Corporation, "Developing a Mobile Application Using Bing Maps SOAP Services," 20 pp., MSDN Library dd483215 (document captured and timestamped May 14, 2012).

Microsoft Corporation, "Integrating MapPoint Web Services with Bing Maps," 25 pp., MSDN Library cc316940 (document captured and timestamped Jun. 17, 2012).

Microsoft Corporation, "Parsing REST Services JSON Responses (C#)," 11 pp., MSDN Library hh674188 (document captured and timestamped Aug. 7, 2012).

Microsoft Corporation, "Parsing REST Services XML Responses (C#)," 8 pp., MSDN Library hh534080 (document captured and timestamped Aug. 7, 2012).

Microsoft Corporation, "Searching for Traffic Incidents Along a Route," 7 pp., MSDN Library hh779734 (document captured and timestamped Aug. 7, 2012).

Microsoft Corporation, "Show Spatial Data Search Results on a Map," 13 pp., MSDN Library hh305205 (document captured and timestamped Aug. 7, 2012).

Microsoft Corporation, "Understanding Scale and Resolution," 3 pp., MSDN Library aa940990 (document captured and timestamped Jul. 9, 2012).

Microsoft Corporation, "Working with 3D," 15 pp., MSDN Library cc451896 (document captured and timestamped Jul. 9, 2012).

Microsoft Corporation, "Working with Events," 9 pp., MSDN Library bb544998 (document captured and timestamped Jul. 9, 2012).

Microsoft Corporation, "Working with Shape Layers," 5 pp., MSDN Library bb545003 (document captured and timestamped Jul. 9, 2012).

Microsoft Corporation, "Working with Shapes," 10 pp., MSDN Library bb545007 (document captured and timestamped Jul. 9, 2012).

Asma Naz, "Three Dimensional Interactive Pictorial Maps," M.S. Thesis, 61 pp. (Dec. 2004).

Notice on the First Office Action dated Oct. 21, 2013, including Search Report, from Chinese Patent Application No. 201110218051.8, 19 pp.

3D LAYERING OF MAP METADATA

CROSS REFERENCE TO RELATED APPLICATIONS

This application is a continuation of U.S. patent application Ser. No. 12/842,880, filed Jul. 23, 2010, which is hereby incorporated by reference.

BACKGROUND

Computer-aided map navigation tools have achieved widespread acceptance. A user can find an address or directions with map navigation tools available at various Web sites. Some software programs allow a user to navigate over a map, zooming in towards the ground or zooming out away from the ground, or moving between different geographical positions. In cars, GPS devices have provided rudimentary road navigation for years. More recently, map navigation software for cellular telephones and other mobile computing devices has allowed users to zoom in, zoom out, and move around a map that shows details about geographical features, town, city, county and state locations, roads, and buildings.

Map navigation tools typically present metadata about map features as being "baked into" a flat, two-dimensional ("2D") view of the map. For example, in a top-down map view, text labels are written over road details or image details at appropriate locations, and the text labels are effectively presented at the same ground level as the road or image details. This can cause excessive visual complexity due to the density of information that needs to be displayed at any given level of viewing the map.

To reduce the density of detail, many map navigation tools hide or reveal metadata depending on the view level of the map. For example, if the view is close to a small-scale feature such as a building, a text label about the feature is revealed, but the text label about the feature is hidden if the view is far from the small-scale feature. On the other hand, a text label about a large-scale feature such as a country or state is shown at a high-level view, but hidden at a view closer to ground level. At any given view level, however, the revealed text labels are still baked into a flat, 2D view of the map. And, the transitions between different view levels can be abrupt, as one 2D view is replaced with the next 2D view showing different metadata. As a result, the viewer can lose context during transitions and become disoriented.

SUMMARY

Techniques and tools are described for rendering views of a map in which map metadata elements are layered in three-dimensional ("3D") space through which a viewer navigates. Layering of map metadata elements in 3D space facilitates smooth motion effects for zoom-in, zoom-out and scrolling operations in map navigation. In many cases, the techniques and tools help a viewer maintain context through transitions between different view levels, which improves the overall experience of using a map navigation tool.

According to one aspect of the techniques and tools described herein, a computing device determines a viewer position that is associated with a view altitude in 3D space. The computing device also determines one or more map metadata elements such as text labels that indicate titles, distances or other details about features on the map. A map metadata element has a metadata altitude in the 3D space and is associated with a feature of the map (e.g., a building, street, neighborhood, city, or state). The computing device renders for display a view of a map based at least in part upon the viewer position and layering of map metadata elements at different altitudes in 3D space.

The rendering of a view of the map depends at least in part on how the view altitude (for the viewer position) relates to the different metadata altitudes of the map metadata elements in 3D space. For example, the computing device places metadata text labels in 3D space above features associated with the labels, respectively, at the metadata altitudes indicated for the labels. The computing device creates the view of the map from points of a surface layer of the map and points of the placed labels that are visible from the viewer position (e.g., not obscured by another feature or label, within a threshold distance from the viewer position, to be rendered with one or more pixels). In some cases, the placed labels are parallel with the surface layer in 3D space and below the altitude of the viewer position. In other cases, some of the placed labels are perpendicular to the surface layer in 3D space, while other labels are parallel to the surface layer in 3D space and above the viewer position.

For navigation as viewer position changes, the computing device repeatedly renders map views for viewer positions that can have different view altitudes in 3D space and/or different geographical positions (e.g., in terms of location at the surface layer). For metadata elements associated with different metadata altitudes in 3D space, the elements can appear to be displaced by different distances from view to view, so as to provide parallax effects when accounting for a change in geographic position between viewer positions in 3D space.

When transitioning between a top-down view and birds-eye view of the map, the rendering can include placing some metadata elements parallel to a surface layer in 3D space for rendering the top-down view, but placing the elements perpendicular to the surface layer in 3D space for rendering the birds-eye view. At the same time, other metadata elements can be placed parallel to the surface layer and above the viewer when rendering the birds-eye view. Between birds-eye views of the map, metadata elements can appear to be rotated and scaled in context with features in the map to account for change between viewer positions in 3D space. Upon switching to a photographic view of a specific feature (e.g., building, landmark) on the map, the rendering can present additional metadata text details pertaining to the specific feature.

To provide smooth transitions between views of a map and thereby help the viewer maintain context, the computing device can repeatedly determine viewer positions between an initial viewer position and destination viewer position in 3D space, and render new views of the map at the new viewer positions. In particular, this can facilitate smooth motion effects for zoom-in, zoom-out and scrolling operations in navigation. For example, to provide a smooth zoom-in effect while transitioning between top-down views as view altitude decreases in 3D space, a metadata text label appears to become larger and darker as the view altitude approaches a target altitude or distance, but appears to become larger and lighter as the view altitude continues to fall below the target altitude or distance, resulting in a gradual fading or dissolving effect for the label. As another example, to provide a smooth transition between top-down and birds-eye views of a map, a label appears to rotate away from the viewer as view altitude decreases towards the metadata altitude of the label, then appears to flip at the metadata altitude of the label.

According to another aspect of the techniques and tools described herein, a client computing device and server computing device exchange information to facilitate map navigation. The client computing device sends a request for map information for a map. In some scenarios, the request indicates one or more search terms. In other scenarios, the request simply indicates a viewer position associated with a view altitude in 3D space. In response, the client computing device receives map metadata elements. Individual map metadata elements are associated with individual features of the map. When the client computing device sent search terms, the client computing device can also receive a viewer position associated with a view altitude in 3D space. The client computing device then renders map views, for example, as described above.

Conversely, the server computing device receives a request for map information from a client computing device, where, for example, the request indicates one or more search terms or a viewer position associated with a view altitude in 3D space. The server computing device determines one or more map metadata elements with altitudes in 3D space, the map metadata elements being usable to render views of the map depending at least in part on how altitude of viewer position relates to the different metadata altitudes of the map metadata elements as layered in 3D space. When the request indicates one or more search terms, the server computing device determines the map metadata elements based at least in part on search results for the one or more search terms, and can also determine the viewer position based on the one or more search terms. The server computing device sends the one or more map metadata elements (and, in some cases, the viewer position) to the client computing device.

To facilitate navigation as viewer position changes, the server computing device can receive a second request for map information from the client computing device, where, for example, the second request indicates one or more other search terms or a second viewer position in 3D space. The server computing device can then determine additional map metadata elements with different altitudes in 3D space, and send the additional map metadata elements to the client computing device (in some cases, along with a second viewer position). Typically, the first batch of map metadata elements and additional map metadata elements are sufficient for the client computing device to render new views of the map between the first viewer position (as an initial position) and second viewer position (as a destination position) and thereby provide smooth transitions between the two viewer positions.

The foregoing and other objects, features, and advantages of the invention will become more apparent from the following detailed description, which proceeds with reference to the accompanying figures.

DETAILED DESCRIPTION

Techniques and tools are described for rendering views of a map in which map metadata elements are separated from the base layer of the map. The map metadata elements can be layered in 3D space above the base layer for the map. For example, map metadata elements are associated with features such as buildings, roads, towns, cities, states in the map, and the map metadata elements are placed in 3D space above the features with which the map metadata elements are associated, at altitudes that depend on the scale of the features (lower altitude for buildings and roads, higher altitudes for cities, and so on). In various scenarios, 3D layering of map metadata elements improves the overall experience of using a map navigation tool.

Separating map metadata elements from the base layer of a map, and using 3D layering of map metadata elements on top of the map, simplify the process of deciding which map metadata elements to reveal or hide for a given task. For example, depending on the terms of a search, different subsets of map metadata elements are selected for rendering. Moreover, altitude values provide a natural hierarchy of metadata elements when deciding which metadata elements to reveal or hide.

3D layering of map metadata elements on a map also facilitates smooth motion effects for zoom-in, zoom-out and scrolling operations as a viewer navigates through 3D space over the map. To help a user maintain context through transitions between different view levels, map metadata elements placed in 3D space can appear to be scaled and/or rotated in context to the user's view on the map. To provide parallax effects as a user moves over map metadata elements in 3D space, map metadata elements can be displaced by different amounts from view to view, depending on altitude in 3D space. These and other graphical transformations of map metadata placed in 3D space add visual depth and context for the user during navigation through the map.

Example Map Metadata Elements with Different Altitudes in 3D Space

In conventional map views presented by map navigation tools, the density of metadata presented on a map view can create visual complexity. Selectively hiding and revealing map metadata in different views can help limit the density of metadata presented, but transitions between different views are problematic. Techniques and tools described herein layer map metadata elements according to altitude in a 3D space. This 3D layering provides a natural hierarchy of map metadata for rendering. It also provides a straightforward way to relate viewer position to the selection of which map metadata elements to hide or reveal when rendering a map view.

Figure 1:
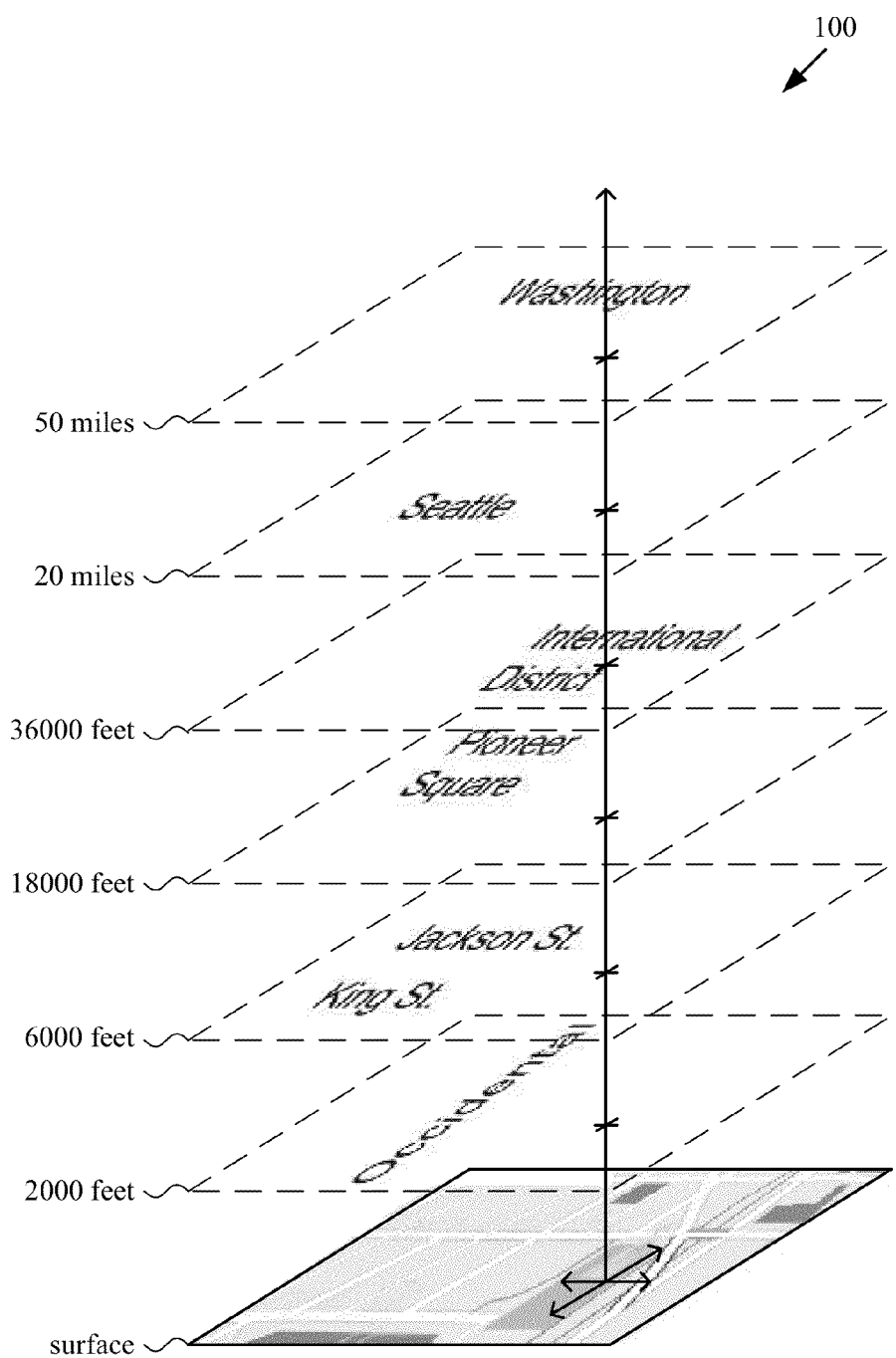
FIG. 1 is a diagram illustrating different metadata altitudes of map metadata text labels in 3D space.

FIG. 1 shows an example of map metadata (100) with different altitudes in 3D space. The map metadata (100) are text labels that appear above a surface layer with details of roads and other geographic features. Different metadata text labels have different altitudes associated with them in 3D space. In FIG. 1, the map metadata appears at six different altitudes: 50 miles, 20 miles, 36000 feet, 18000 feet, 6000 feet and 2000 feet.

Generally, map metadata elements are associated with an altitude depending on the scale of the feature annotated by the map metadata. Large-scale features such as countries and big states are associated with higher altitudes. In FIG. 1, the highest altitude map metadata is a text label for Washington associated with an altitude of 50 miles. Small-scale features such as buildings and small streets are associated with lower altitudes. In FIG. 1, the lowest altitude map metadata is a text label for Occidental associated with an altitude of 2000 feet. Map metadata text labels for Jackson St. and King St. are associated with an altitude of 6000 feet, and a map metadata text label for Pioneer Square is associated with an altitude of 18000 feet. For progressively larger scale features, text labels for International District and Seattle are associated with altitudes of 36000 feet and 20 miles, respectively. Typically, metadata altitude for a metadata element increases with geographic scale of the feature annotated by the metadata element.

For the sake of simplicity, FIG. 1 shows only one or two examples of map metadata (100) at each of the indicated altitudes. Real-world examples of map metadata will typically include many more labels for features of the map. For example, labels for many other streets in the map could be associated with altitudes of 2000 feet and 6000 feet in FIG. 1. On the other hand, in some scenarios, the map metadata rendered in a map view is deliberately limited to focus on metadata most likely of interest to the viewer. This could be the case, for example, when map metadata is selected responsive to a search or otherwise selected for a task-specific purpose.

As shown in FIG. 1, the map metadata (100) can be text labels for place names of states cities, neighborhoods and streets. The map metadata can also be text labels for buildings, stores within buildings, landmarks or other features in the map. Aside from names, the map metadata can be distances between features. Or, the map metadata can provide additional details for a given feature such as contact information (e.g., phone number, Web page, address), reviews, ratings, other commentary, menus, photos, advertising promotions, or games (e.g., geo-caching, geo-tagging). Links can be provided for Web pages, to launch a Web browser and navigate to information about the feature.

In terms of data organization for storage and transmission, an individual element of the map metadata can have an attribute or property for altitude. Assigning an altitude per map metadata element facilitates fine-grain specification of different altitudes for different features. Alternatively, different map metadata elements are organized by layer, such that all map metadata elements are at 2000 feet are organized together, all map metadata elements at 6000 feet are organized together, and so on. Organizing map metadata by altitude layer can facilitate operations that affect a whole layer of metadata. Regardless of how map metadata are organized for storage and transmission, 3D layering of map metadata elements can be part of the rendering process for the metadata elements in a map view.

The number of different altitudes of map metadata, and the values used for the different altitudes, depend on implementation. To illustrate the concept of different altitudes for map metadata, FIG. 1 shows six different altitudes that are widely separated, but there can be more or fewer different altitudes in 3D space, and altitudes can have values different than the ones shown in FIG. 1. In actual use scenarios, layers of map metadata will typically have altitudes that are closer together, especially in situations when elements from the layers are concurrently rendered for display. The altitudes for map metadata elements can be static, or the altitudes can be dynamically adjusted from initially assigned values for the sake of presentation. For example, as a user navigates in 3D space, the altitude values for map metadata elements can be brought closer together so that parallax effects are more gradual. (Concurrently rendering metadata elements with widely spaced altitudes can result in parallax effects that are too abrupt as the viewer changes geographic positions.)

The number of different altitudes for map metadata potentially affects the quality of the user experience. If too few different altitudes are used, transitions may become abrupt as many details are revealed or hidden at the same time, and a given map view may become crowded with metadata details that suddenly appear. On the other hand, having too many different altitudes can result in excessive computational complexity as a computing device determines the appropriate scale, sample adjustments, etc. for map metadata on an element-by-element basis from view to view. Further, if elements with close altitude values are processed in a markedly different way in rendering decisions, the results can be unexpected or disorienting for the user.

In FIG. 1, the altitudes of the map metadata (100) are given in terms of feet and miles. The units used to represent altitude values depend on implementation; metric units or units in any other measurement system can be used. The altitude values can be real world altitudes above the surface layer of the map or above sea level. Alternatively, the altitude values are, more abstractly, values along a third dimension of a 3D space in which a viewer position has a value indicating placement along the third dimension.

Example Rendering of Map Metadata Elements with Different Altitudes in 3D Space

Figure 2:
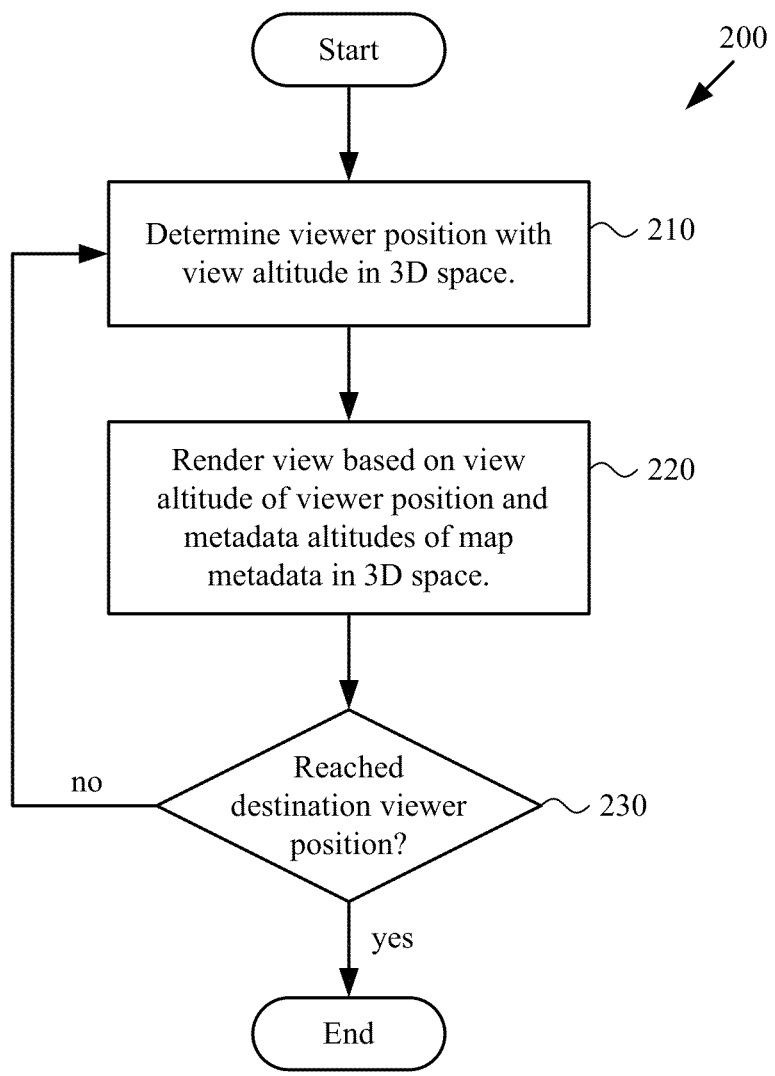
FIG. 2 is a flowchart illustrating a generalized technique for rendering map views that depend on viewer position and different altitudes of map metadata elements in 3D space.

FIG. 2 shows a generalized technique (200) for rendering map views that depend on viewer position and different altitudes of map metadata elements in 3D space. A tool such as a mobile computing device or other client computing device can perform the technique (200).

To start, the tool determines (210) a viewer position associated with an altitude in 3D space (here, the view altitude, or altitude of the viewer position). For example, the viewer position is initially a default viewer position, the last viewer position reached in a previous navigation session, a previously saved viewer position, or a viewer position indicated as the result of a search. In subsequent iterations, the viewer position can be a destination viewer position in 3D space or an intermediate viewer position between the previous viewer position and a destination viewer position in 3D space.

The tool renders (220) a view of the map for display. The tool renders (220) the view based on view altitude of the viewer position and layering of map metadata elements in 3D space, potentially at metadata altitudes (that is, the altitudes of the metadata elements) that are different for different metadata elements. For example, the map metadata elements are text labels at different altitudes in 3D space, and the rendered view depends on how the view altitude of the viewer position relates to the different metadata altitudes for the map metadata text labels in 3D space. The tool can get the map metadata elements from the client computing device and/or from a server computing device (e.g., using the techniques described with reference to FIGS. 9a and 9b).

The exact operations performed as part of the rendering (220) depend on implementation. In some implementations, the tool determines a field of view (e.g., a volume that originates at the viewing position and extends towards a surface layer) and identifies features of the map that are in the field of view (or, for distant features, have space above them that is in the field of view), considering the altitude, geographical position and angle of the viewer position. Then, for those features, the tool selects map metadata elements. This may include any and all of the map metadata elements for the identified features that are potentially visible in the field of view. (E.g., within a threshold distance from the viewer position.) Or, it may include a subset of those potentially visible map metadata elements which are relevant to the navigation scenario (e.g., search). The tool places the selected map metadata elements in the 3D space at their respective altitudes above the features marked by the elements, and assigns resolutions for the elements depending on metadata altitude and/or distance away from the viewer position. For example, the assigned resolutions indicate size of the elements and how light or dark the elements are. For example, for rendering a top-down view of the map, the tool places the elements in 3D space parallel to a surface layer of the map. Or, for rendering a birds-eye view of the map, the tool places some elements in 3D space perpendicular to the surface layer, at or near the surface layer. (For rendering the birds-eye view, other elements can be placed parallel to the surface layer and above the viewer position, to provide the effect of looking up to the elements in the sky.) Finally, the tool creates the map view from points of the surface layer and points of the placed labels that are visible (e.g., not obscured by another feature or label, within a threshold distance from the viewer position, to be rendered with one or more pixels) from the viewer position. For example, the tool starts with the surface layer and empty air space, then composites metadata elements moving upward from surface layer to the viewer position, or moving outward from the viewer position. This stage provides the effects of rotation, scaling, shrinking towards a perspective point, etc. for elements and features when rendering a birds-eye view. Alternatively, the tool implements the rendering (220) using acts in a different order, using additional acts, or using different acts.

Although the tool primarily adjusts rendering (220) of map metadata elements in ways that depend on metadata altitudes, the tool can also adjust the metadata altitudes themselves before or during rendering. For example, the tool adjusts metadata altitudes for map metadata elements to bring the altitudes closer together. If rendered metadata elements are too far apart in altitude, a small change in the geographic position of the viewer can cause an extreme apparent displacement of one map metadata element while causing a tiny apparent displacement of another map metadata element. To avoid such abrupt parallax effects, the metadata altitudes of elements can be brought closer together while maintaining the relative ordering and relative distances between elements. This results in more gradual changes in scale and apparent positions of metadata elements as the viewer navigates through 3D space.

Generally, for the rendering, the tool performs various operations on map metadata elements layered in 3D space, including rotation, scaling, adjustment of sample values, and selective suppression or addition of map metadata details. FIGS. 4a-4d, 5a-5d, 6a-6d, 7a-7g and 8 illustrate examples of these and other operations for map metadata text labels. Adjustment of how and when map metadata elements are presented during navigation helps a viewer stay oriented during navigation. FIGS. 4a-4d, 5a-5d and 6a-6d show examples of top-down views rendered during navigation through map metadata text labels layered in 3D space, in which metadata altitude is the main indicator of which map metadata details to render and how to render such details. FIGS. 7a-7g show examples of top-down views and birds-eye views. In the top-down views and transitions from top-down to birds-eye perspective, metadata altitude is still considered as a parameter to determine level of detail and scale for map metadata text labels. In the birds-eye views, the tool also considers distance from the viewer, extending away from the viewer towards the horizon, to determine level of detail and scale for map metadata text labels.

Returning to FIG. 2, the tool determines (230) whether it has reached a destination viewer position for rendering map views. The destination viewer position can be the initial (and only) viewer position, or it can be a different viewer position. If the tool has not reached the destination viewer position, the tool repeats the acts of determining (210) and rendering (220) for another viewer position. The other viewer position can differ from the previous viewer position in terms of geographical position over a 2D surface and/or view altitude in 3D space. In this way, the tool can repeat the acts of determining (210) and rendering (220) for first, second, third, etc. viewer positions in succession, or the tool can keep the current map view.

The tool can react to user input that indicates a change in viewer position. For example, the user input is gesture input from a touchscreen or keystroke input from a keyboard. In this situation, the tool determines (210) a new viewer position indicated by the input (or a new viewer position to transition towards a destination indicated by the input) and renders (220) a view for that new viewer position. In particular, to provide smooth motion effects when zooming between altitudes and/or scrolling over geographic positions from an initial viewer position to the destination viewer position, the tool can repeat the determining (210) and rendering (220) acts for viewer positions between the initial and destination viewer positions. The number of map views rendered for smooth motion effects depends on implementation. For example, 4 map views per second are rendered. During this transition towards a given destination viewer position, the tool can assign a new destination viewer position if interrupted (e.g., by user input indicating the new destination viewer position).

Example Software Architecture for Rendering of Map Metadata

Figure 3:
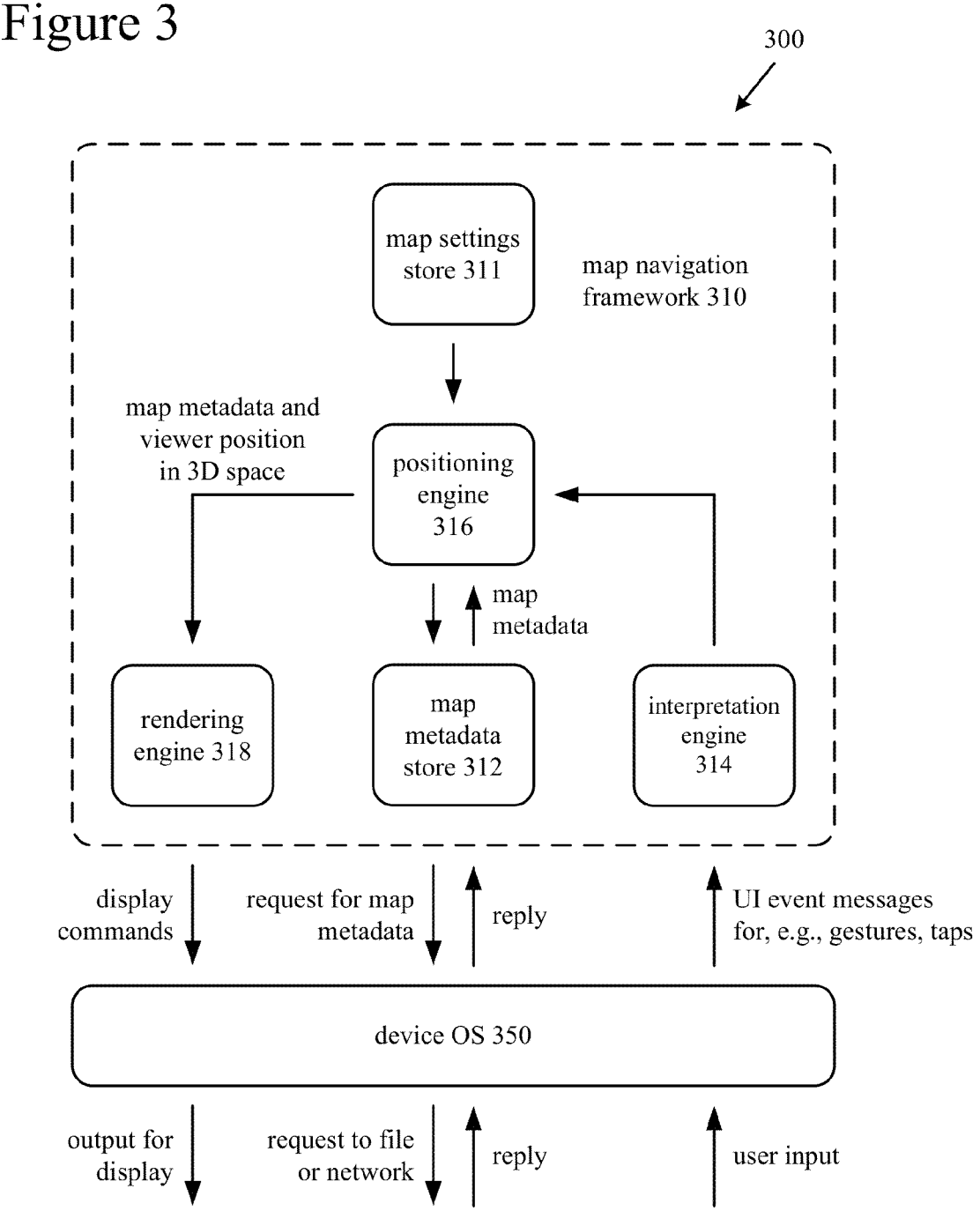
FIG. 3 is a block diagram illustrating an example software architecture for a map navigation tool that renders map views depending on viewer position and different altitudes of map metadata elements in 3D space.

FIG. 3 shows an example software architecture (300) for a map navigation tool that renders map views depending on viewer position and different altitudes of map metadata in 3D space. A client computing device (e.g., smart phone or other mobile computing device) can execute software organized according to the architecture (300) to render views according to the method (200) of FIG. 2 or another method.

The architecture (300) includes a device operating system (350) and map navigation framework (310). The device OS (350) manages user input functions, output functions, storage access functions, network communication functions, and other functions for the device. The device OS (350) provides access to such functions to the map navigation framework (310).

A user can generate user input that affects map navigation. The device OS (350) includes functionality for recognizing user gestures and other user input and creating messages that can be used by map navigation framework (310). The interpretation engine (314) of the map navigation framework (310) listens for user input event messages from the device OS (350). The UI event messages can indicate a panning gesture, flicking gesture, dragging gesture, or other gesture on a touchscreen of the device, a tap on the touchscreen, keystroke input, or other user input (e.g., voice commands, directional buttons, trackball input). The interpretation engine (314) translates the UI event messages into map navigation messages sent to a positioning engine (316) of the map navigation framework (310).

The positioning engine (316) considers a current viewer position (possibly provided as a saved or last viewer position from the map settings store (311)), any messages from the interpretation engine (314) that indicate a desired change in viewer position, and map metadata with different metadata altitudes in 3D space. From this information, the positioning engine (316) determines a viewer position in 3D space. The positioning engine (316) provides the viewer position as well as map metadata in the vicinity of the viewer position to the rendering engine (318).

The positioning engine (316) gets map metadata for a map from a map metadata store (312). The map metadata store (312) caches recently used map metadata. As needed, the map metadata store (312) gets additional or updated map metadata from local file storage or from network resources. The device OS (350) mediates access to the storage and network resources. The map metadata store (312) requests map metadata from storage or a network resource through the device OS (350), which processes the request, receives a reply, and provides the requested map metadata to the map metadata store (312). In some scenarios, the request for map metadata takes the form of a search query, and map metadata responsive to the search is returned.

The rendering engine (318) processes the viewer position and map metadata in 3D space, and renders a map view. Depending on the use scenario, the rendering engine (318) can render map metadata from local storage, map metadata from a network server, or a combination of map metadata from local storage and map metadata from a network server. The rendering engine (318) provides display commands for the rendered map view to the device OS (350) for output on a display.

Example Zoom-in and Zoom-out Navigation

Figure 4A:
FIGS. 4a-4d are screenshots illustrating example map views as view altitude decreases during navigation through map metadata text labels at different metadata altitudes in 3D space.

FIGS. 4a-4d show example map views (410, 420, 430, 440) as view altitude decreases during navigation through map metadata text labels at different altitudes in 3D space. FIG. 4a shows a high-level map view (410) of western Washington. The metadata text label for Washington is much closer in 3D space to the current viewer position than the names of the cities Seattle, Bremerton and Issaquah. The size of the label for Washington is thus larger to signify the closer proximity to the viewer (and larger scale of the annotated geographical feature).

Figure 4B:
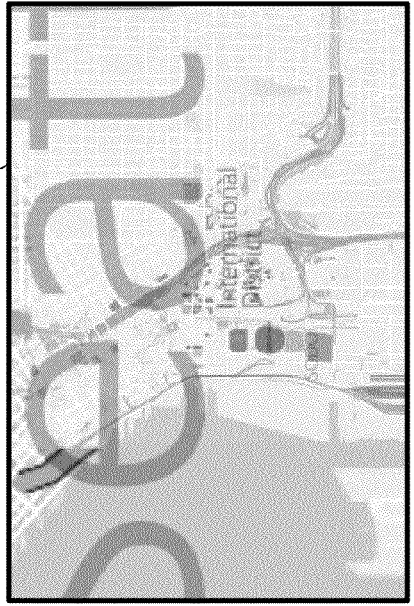

In FIG. 4b, the altitude of the viewer position has decreased as the viewer zooms in towards Seattle. In the map view (420) of FIG. 4b, the text label for Washington is larger but fainter, as the altitude of the viewer position approaches the altitude associated with the Washington label. Compared to FIG. 4a, the label for Seattle is larger and darker in the map view (420) of FIG. 4b.

Figure 4C:
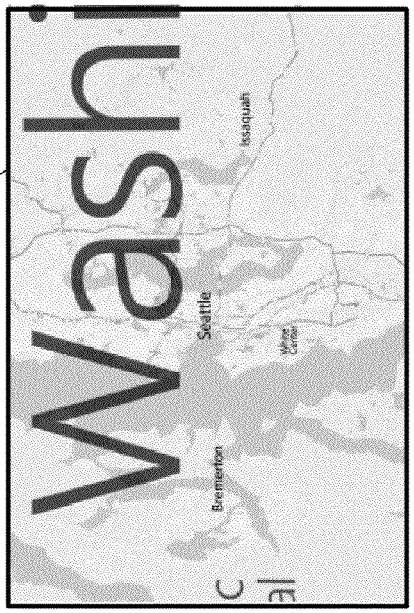
Figure 4D:
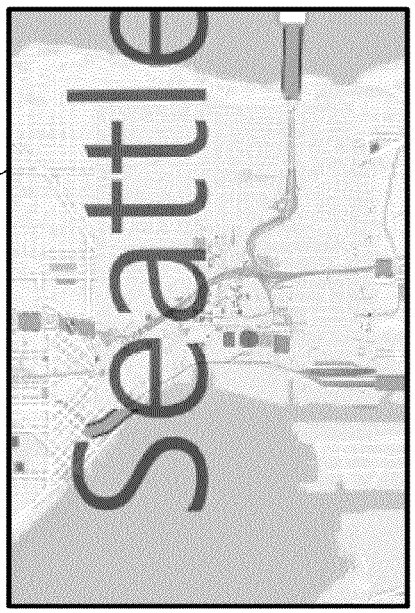

As the viewer continues to zoom towards Seattle, the size of the label for Seattle increases in the map views (430, 440) of FIGS. 4c and 4d. Below a target altitude associated with the label (here, not the altitude in 3D space at which the label is placed) or target distance from the label, the label for Seattle becomes successively lighter. Eventually, the label for Seattle is displaced out of the map view, or the label dissolves if the viewer position passes directly through it. FIG. 7a shows a top-down map view (710) even closer to the surface layer of the map, as the altitude of the viewer position continues to decrease. In FIG. 7a, the labels for Washington and Seattle have zoomed past the field of view, and metadata details within the city have zoomed into view.

In summary, for the zoom-in operation illustrated in FIGS. 4a-4d, a metadata text label appears small, then successively larger and darker/sharper between views. After reaching a peak darkness/sharpness, the text label continues to grow between views but also fades/dissolves, or floats out of view.

Figure 5A:
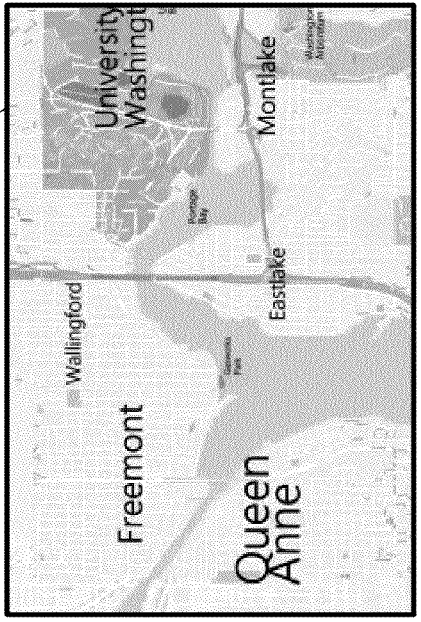
FIGS. 5a-5d are screenshots illustrating example map views as view altitude increases during navigation through map metadata text labels at different metadata altitudes in 3D space.

For a zoom-out operation, rendering of map metadata text labels generally mirrors the rendering for zoom-in operations. FIGS. 5a-5d show example map views (510, 520, 530, 540) as view altitude increases during navigation through map metadata text labels at different altitudes in 3D space. In FIG. 5a, the map view (510) shows metadata text labels such as the label for Eastlake, which shrink in size from view to view as the viewer zooms out from the surface layer. As the viewer zooms out through map views (520, 530, 540) in FIGS. 5b-5d, labels at higher altitudes are brought into view and rendered in large size from view to view, and labels at lower altitudes in a wider geographic area are brought into view and rendered in small size. When directly passing through a label (e.g., the label for Washington), the label is at first faint but becomes darker from view to view as altitude increases over the label.

FIGS. 4a-4d and 5a-5d each show concurrent display of map metadata text labels at different metadata altitudes in 3D space, where the size of the labels and darkness/lightness of the labels depends on altitude. These visual cues help orient the viewer in zoom-in and zoom-out operations.

Example Scrolling Navigation with Parallax Effects

FIGS. 6a-6d show example map views (610, 620, 630, 640) as geographic position changes during navigation over map metadata text labels at different metadata altitudes in 3D space. In particular, for the navigation illustrates in FIGS. 6a-6d, the altitude of the viewer position is essentially unchanged, but the geographic position moves north/northeast. Parallax effects are exhibited for metadata text labels, which stay in place in 3D space over the features they mark, but appear to move between the map views (610, 620, 630, 640) of FIGS. 6a-6d.

Figure 6B:
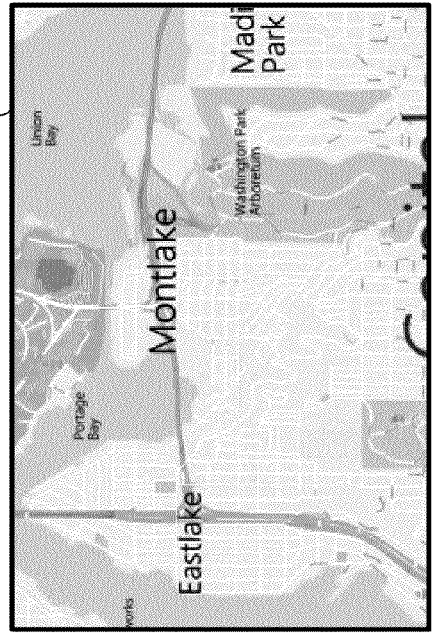
FIGS. 6a-6d are screenshots illustrating example map views as geographic position changes during navigation over map metadata text labels at different metadata altitudes in 3D space.
Figure 6D:
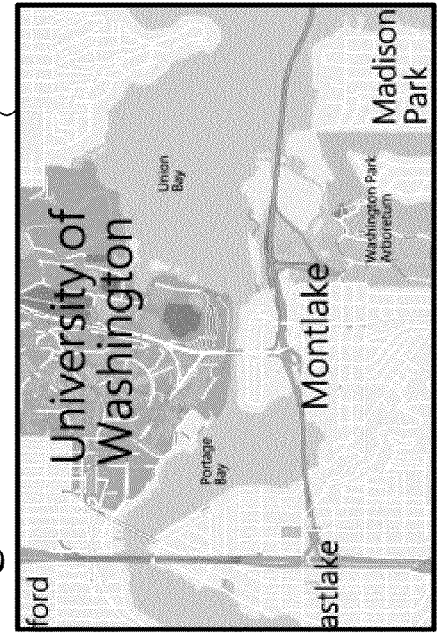
Figure 6A:
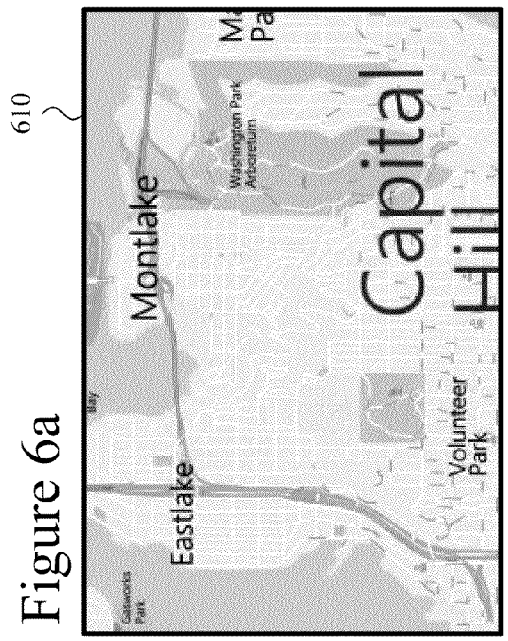
Figure 6C:
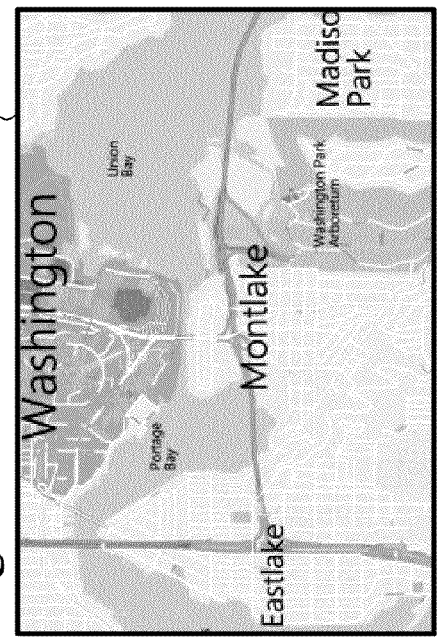

The map view (610) of FIG. 6a shows a metadata text label for Montlake, for example, that appears over a highway. As the viewer moves north/northeast, the position of the label for Montlake appears to move south/southwest between the map views (620, 630, 640) of FIGS. 6b-6d. Some other metadata text labels exhibit parallax effects to a greater or less extent. For example, the metadata text label for Capitol Hill is displaced entirely out of view by the rendered map view (630) of FIG. 6c. Text labels associates with low altitudes, which are further from the viewer, are displaced by smaller distances between the rendered map views.

Generally, when geographic position of the viewer changes, the distances that different metadata text labels are displaced between the rendered top-down views depend on the metadata altitudes associated with the labels, relative to the view altitude. Labels close to the viewer are displaced more between map views, and labels further from the viewer (closer to the ground) are displaced less between map views.

Figure 5B:
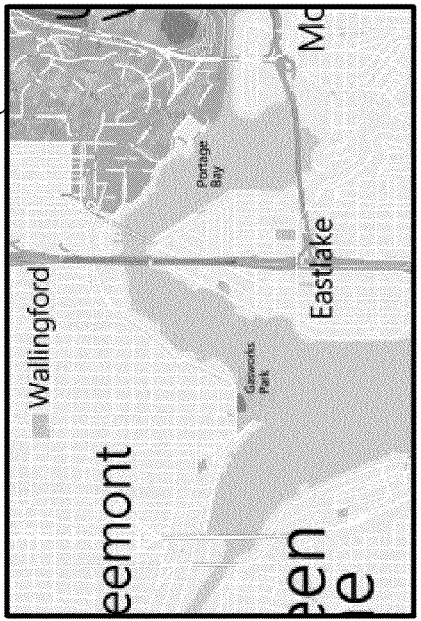
Figure 5C:
Figure 5D:
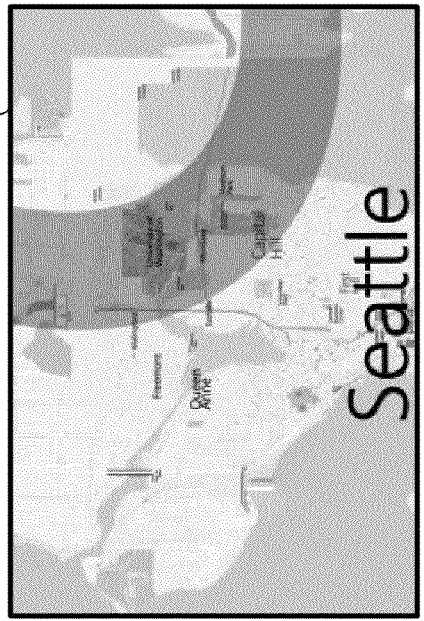

In addition, parallax effects can appear between views when altitude changes. In FIGS. 5a-5c, for example, the label for Queen Anne appears to shift due to change in perspective for the viewer position as view altitude increases. As view altitude changes, labels closer to the sides are displaced more between map views, and labels in the middle (closer to directly under the viewer) are displaced less between map views.

Example Top-down to Birds-eye Perspective Changes and Birds-eye Views

FIGS. 7a-7g show example map views (710, 720, 730, 740, 750, 760, 770) as view altitude and geographic position change during navigation in 3D space. The overall progression through FIGS. 7a-7g shows a transition from top-down perspective to birds-eye perspective in the map views.

FIG. 7a shows a top-down map view (710) at a low view altitude. Metadata text labels for small streets are visible, albeit at a small size. As view altitude decreases past a trigger altitude, transitional map views (720, 730, 740, 750) are rendered until a final birds-eye perspective is reached. The trigger altitude depends on implementation. For example, the trigger altitude for automatically transitioning to birds-eye perspective can be 1000 feet. Several changes happen in the transitional map views (720, 730, 740, 750) of FIGS. 7b-7e.

Figure 7B:
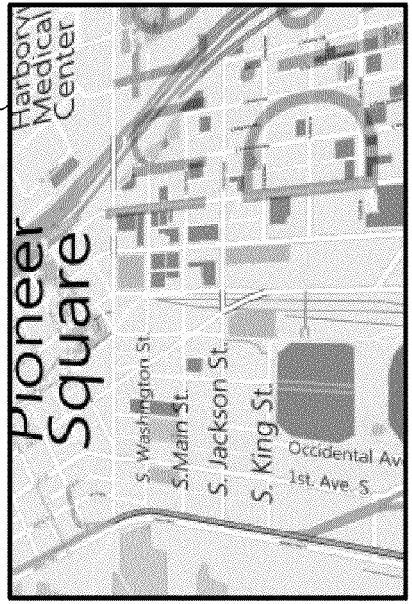
FIGS. 7a-7g are screenshots illustrating example map views as view altitude and geographic position change during navigation in map metadata text labels at different metadata altitudes in 3D space.
Figure 7D:
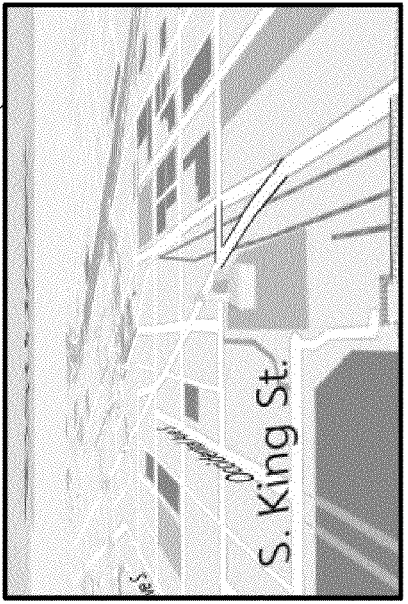
Figure 7A:
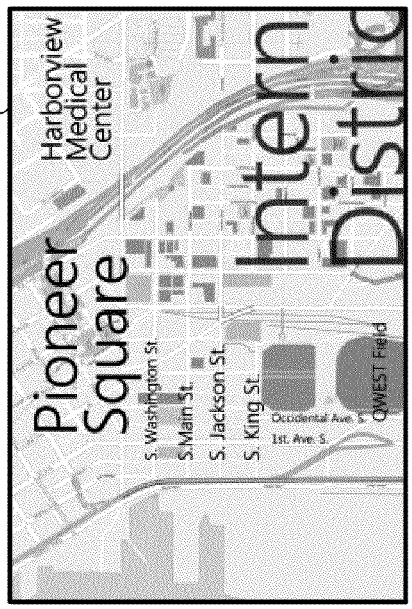
Figure 7C:
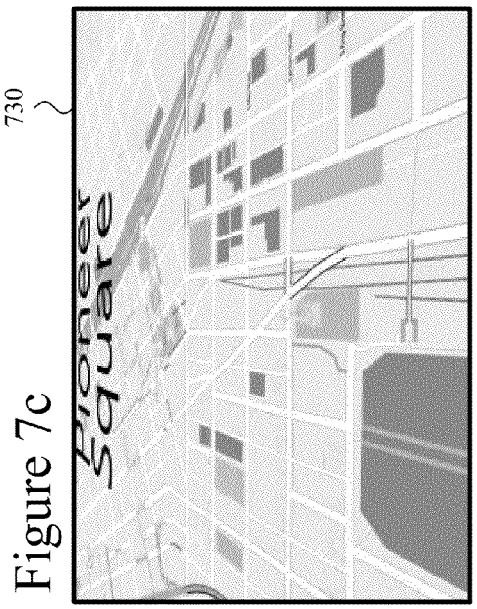

As view altitude decreases, a metadata text label close to the viewer (such as the text label for Pioneer Square) is rotated away from the viewer from view to view, as shown in the transitional views (720, 730) of FIGS. 7b and 7c. As the view altitude passes below the altitude of the label in 3D space (see the view (740) of FIG. 7d), the text orientation of the label is flipped between views so that the top of the text label is close to the viewer instead of far from the viewer. Eventually, the text label is rendered consistently with an orientation that is parallel to the surface layer of the map in 3D space, with the effect that the text label floats in the air space above the surface of the map in rendered map views.

Figure 7F:
Figure 7E:
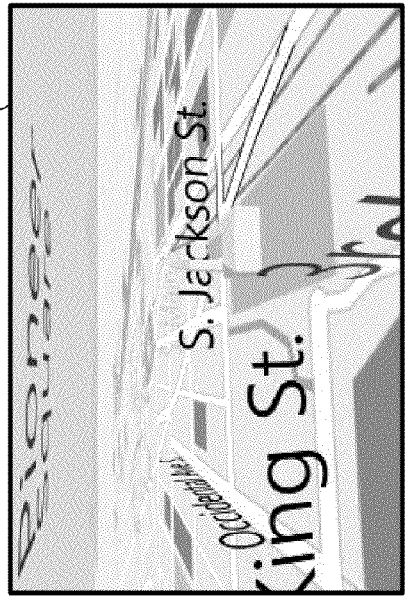
Figure 7G:

The text labels for streets (the labels being parallel to the surface layer in 3D space for rendering of top-down views) dissolve between views (720, 730) of FIGS. 7b and 7c. The text labels re-materialize in views (740, 750) of FIGS. 7d and 7e after being placed perpendicular to the surface layer in 3D space. Placing the street labels perpendicular to the map surface, and just above the map surface, aids viewing of the street names after the labels are rendered in birds-eye views. Generally, the street labels also run parallel to the streets they mark, respectively. As shown in FIGS. 7e-7g, other labels (such as the label for Pioneer Square) can remain parallel to the surface layer in 3D space, even for rendering of birds-eye views.

In the birds-eye views (750, 760, 770) of FIGS. 7e-7g, text labels are rotated and scaled along with map features as the viewer position changes in terms of view altitude and/or geographic position. In addition, the text labels shrink towards a distant perspective point away from the viewer. The rotation and scaling as viewer position changes cause parallax effects—even though the text labels do not move in 3D space, they appear to move between the rendered views. Generally, in FIGS. 7e-7g, text labels that are perpendicular to the surface map run parallel in 3D space to the features they mark, and this parallel orientation in 3D space is maintained by rotation from view to view as the viewer position changes.

For rendering in the birds-eye view, the size of the metadata text labels in a view and the level of metadata detail to reveal in the view depend on distance away from the viewer. The level of detail and size can also depend on other factors (e.g., minor street vs. major street, metadata element relevant to search result or not).

Example Photographic View

Figure 8:
FIG. 8 is a screenshot illustrating an example photographic view of a feature in a map.

FIG. 8 shows an example photographic view (810) of a feature in a map. The view (810) shows metadata details relevant to a specific location on the map. The metadata for the specific location is floating in 3D space adjacent the location and perpendicular to the surface layer, and the metadata details are rendered accordingly. Outside the area of the photographic view (810) that shows the actual location, portions of the view (810) have been grayed out or otherwise modified, so as to highlight the actual location.

The viewer can transition to a photographic view, for example, by selecting an individual feature of the map. Or, the viewer can transition to a photographic view by navigating directly into a specific feature on the map.

Example Client-Server Protocol for Requesting-Delivering Map Metadata

Figure 9A:
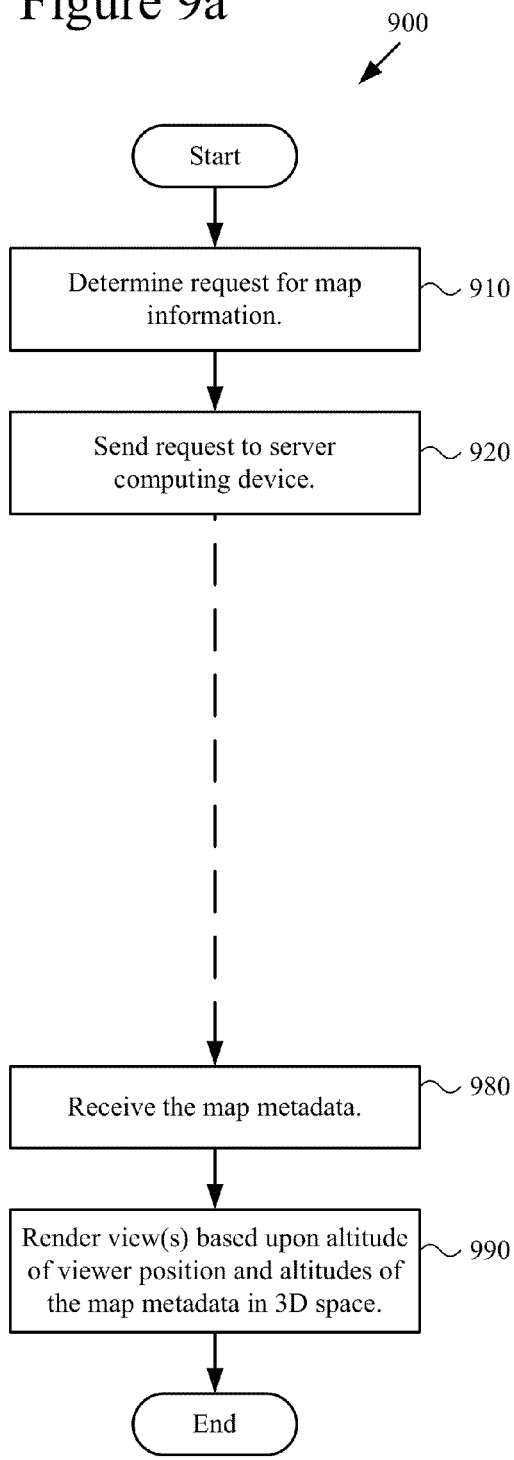
FIGS. 9a and 9b are flowcharts illustrating generalized techniques for requesting and delivering, respectively, map metadata elements with different altitudes in 3D space.
Figure 9B:
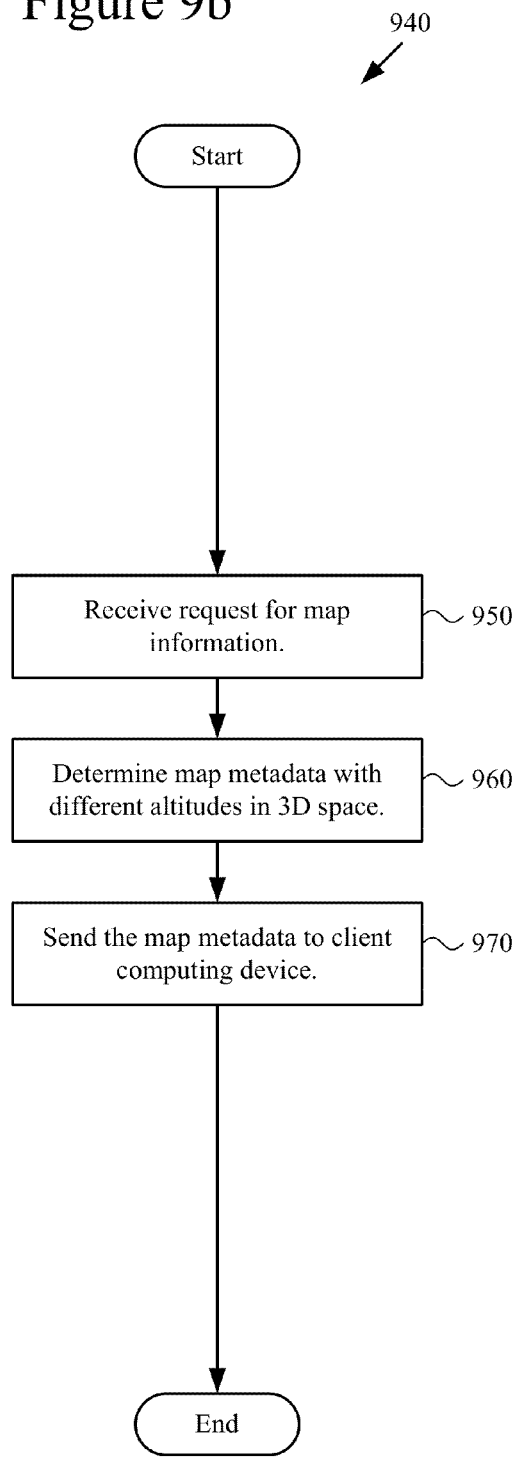

FIGS. 9a and 9b show generalized techniques (900, 940) for requesting and delivering, respectively, map metadata with different metadata altitudes in 3D space. A client computing device such as a mobile computing device can perform the technique (900) for requesting map metadata, and a server computing device such as a network server can perform the technique (940) for delivering map metadata.

To start, the client computing device determines (910) a request for map information. The request can include a viewer position in 3D space, or the request can include one or more search terms for a search that can yield a viewer position in 3D space. The client computing device sends (920) the request to a server computing device.

The server computing device receives (950) a request for map information for a map (e.g., specifying a viewer position in 3D space, or specifying search terms responsive to which a viewer position in 3D space may be identified). From information in the request, the server computing device determines (960) map metadata elements with different metadata altitudes in 3D space. For example, the server computing device finds map metadata elements visible from a viewer position specified in the request, using metadata altitude as a control parameter for which elements are visible. Or, the server computing device finds a viewer position from search results for search term(s) specified in the request, finds map metadata elements from the search results, and selects some or all of those map metadata elements which are visible from the viewer position, using metadata altitude as a level-of-detail control parameter for the search results. The map metadata elements are usable to render views of the map depending at least in part on how altitude of viewer position relates to the different altitudes of the map metadata elements as layered in the 3D space according to their respective metadata altitudes.

The server computing device sends (970) the map metadata elements to the client computing device. The server computing device can receive a second request for map information from the same client computing device. The server computing device then determines additional map metadata elements and sends the additional elements to the client computing device. In some cases, the initial and additional map metadata elements are sufficient for the client computing device to render a new view of the map for each of multiple new viewer positions between the first viewer position and a second viewer position.

Returning to FIG. 9a, the client computing device receives (980) the map metadata from the server computing device and renders (990) one or more views of the map based upon view altitude of viewer position and metadata altitudes of the map metadata elements in 3D space. For example, the client computing device renders views according to the method (200) of FIG. 2 or another method. When rendering the map metadata elements received from the server computing device, the client computing device can combine map metadata elements from other server computing devices and/or the client computing device itself.

The server computing device (when providing map metadata) or client computing device (when placing map metadata elements) can rank map metadata elements based on what the user is likely to want. For a search, the server computing device can give higher rank to metadata more likely to be useful to viewer, so that such metadata is revealed earlier and/or given more prominence. For example, if the search seeks information about a specific kind of restaurant or shop, the server computing device assigns selected metadata for them higher rank than metadata for other restaurants/shops, and also increases the rank of the selected metadata relative to other kinds of map metadata (e.g., for streets). Or, if the search seeks information about a particular street, the server computing device increases the rank of metadata for streets and directions, relative to other kinds of metadata. This makes the increased-rank metadata appear sooner and/or with more prominence during scenario-based rendering that combines the search results with 3D layering of map metadata.

Although FIGS. 9a and 9b show acts of a single client computing device and single server computing device, one server computing device can service requests from multiple client computing devices. Moreover, a given client computing device can select between multiple server computing devices. Server processing can be stateless, or a server computing device can remember state information for specific client computing devices from request to request.

Example Mobile Computing Device

Figure 10:
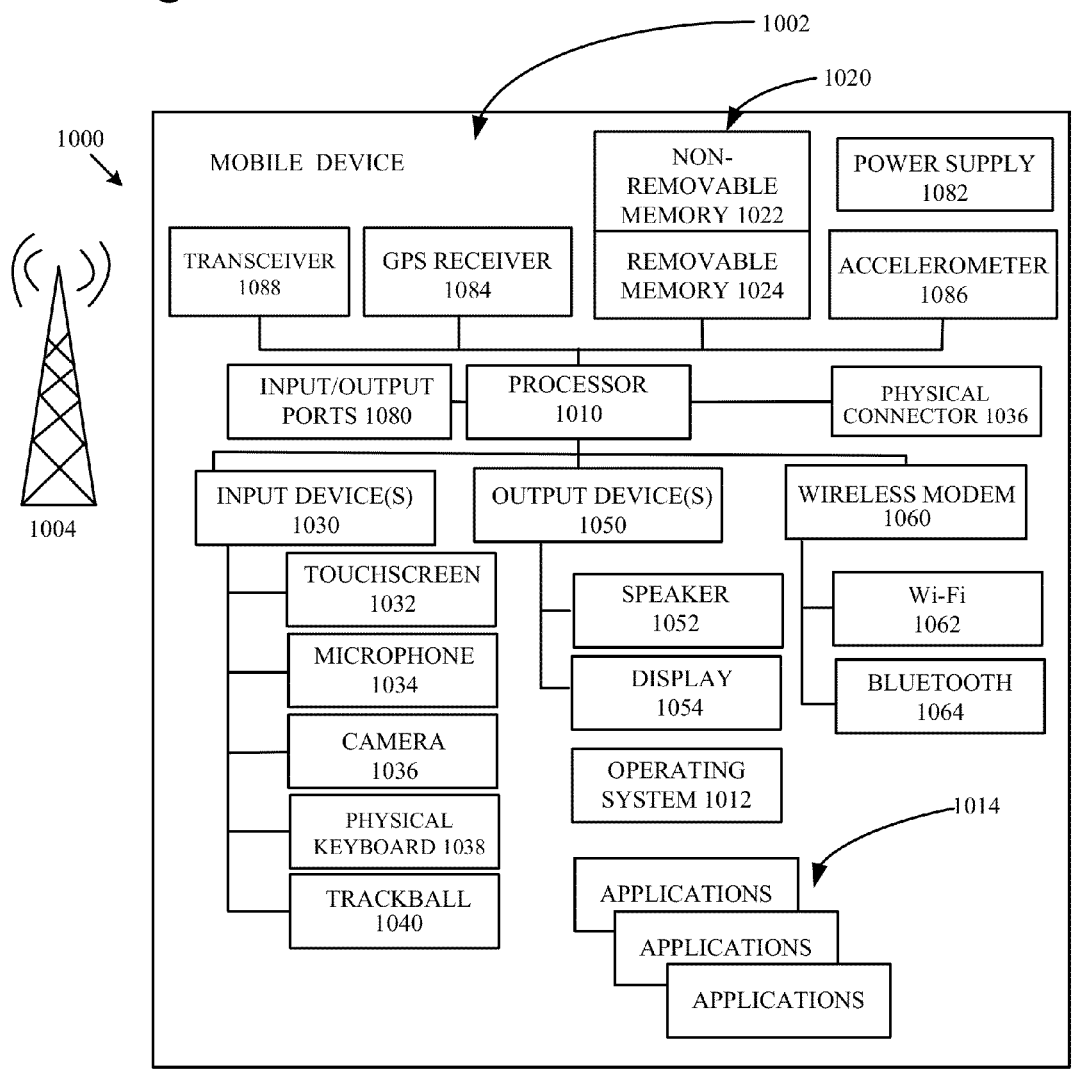
FIG. 10 is a block diagram illustrating an example mobile computing device in conjunction with which techniques and tools described herein may be implemented.

FIG. 10 depicts a detailed example of a mobile computing device (1000) capable of implementing the techniques and solutions described herein. The mobile device (1000) includes a variety of optional hardware and software components, shown generally at (1002). Any components (1002) in the mobile device can communicate with any other component, although not all connections are shown, for ease of illustration. The mobile device can be any of a variety of computing devices (e.g., cell phone, smartphone, handheld computer, laptop computer, notebook computer, tablet device, netbook, Personal Digital Assistant (PDA), camera, video camera, etc.) and can allow wireless two-way communications with one or more mobile communications networks (1004), such as a Wi-Fi, cellular, or satellite network.

The illustrated mobile device (1000) can include a controller or processor (1010) (e.g., signal processor, microprocessor, ASIC, or other control and processing logic circuitry) for performing such tasks as signal coding, data processing, input/output processing, power control, and/or other functions. An operating system (1012) can control the allocation and usage of the components (1002) and support for one or more application programs (1014). In addition to map navigation software, the application programs can include common mobile computing applications (e.g., email applications, calendars, contact managers, web browsers, messaging applications), or any other computing application.

The illustrated mobile device (1000) can include memory (1020). Memory (1020) can include non-removable memory (1022) and/or removable memory (1024). The non-removable memory (1022) can include RAM, ROM, flash memory, a hard disk, or other well-known memory storage technologies. The removable memory (1024) can include flash memory or a Subscriber Identity Module (SIM) card, which is well known in GSM communication systems, or other well-known memory storage technologies, such as "smart cards." The memory (1020) can be used for storing data and/or code for running the operating system (1012) and the applications (1014). Example data can include web pages, text, images, sound files, video data, or other data sets to be sent to and/or received from one or more network servers or other devices via one or more wired or wireless networks. The memory (1020) can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device (1000) can support one or more input devices (1030), such as a touch screen (1032), microphone (1034), camera (1036) (e.g., capable of capturing still pictures and/or video images), physical keyboard (1038) and/or trackball (1040) and one or more output devices (1050), such as a speaker (1052) and a display (1054). Other possible output devices (not shown) can include piezoelectric or other haptic output devices. Some devices can serve more than one input/output function. For example, touchscreen (1032) and display (1054) can be combined in a single input/output device.

A wireless modem (1060) can be coupled to an antenna (not shown) and can support two-way communications between the processor (1010) and external devices, as is well understood in the art. The modem (1060) is shown generically and can include a cellular modem for communicating with the mobile communication network (1004) and/or other radio-based modems (e.g., Bluetooth (1064) or Wi-Fi (1062)). The wireless modem (1060) is typically configured for communication with one or more cellular networks, such as a GSM network for data and voice communications within a single cellular network, between cellular networks, or between the mobile device and a public switched telephone network (PSTN).

The mobile device can further include at least one input/output port (1080), a power supply (1082), a satellite navigation system receiver (1084), such as a Global Positioning System (GPS) receiver, an accelerometer (1086), a transceiver (1088) (for wirelessly transmitting analog or digital signals) and/or a physical connector (1036), which can be a USB port, IEEE 1394 (FireWire) port, and/or RS-232 port. The illustrated components (1002) are not required or all-inclusive, as any components can deleted and other components can be added.

The mobile device (1000) can implement the technologies described herein. For example, the processor (1010) can determine viewer positions and render views of a map during map navigation in 3D space. The processer (1010) can also process user input to determine changes in viewer position. As a client computing device, the mobile computing device can send requests to a server computing device, and receive map metadata in return from the server computing device.

Example Network Environment

Figure 11:
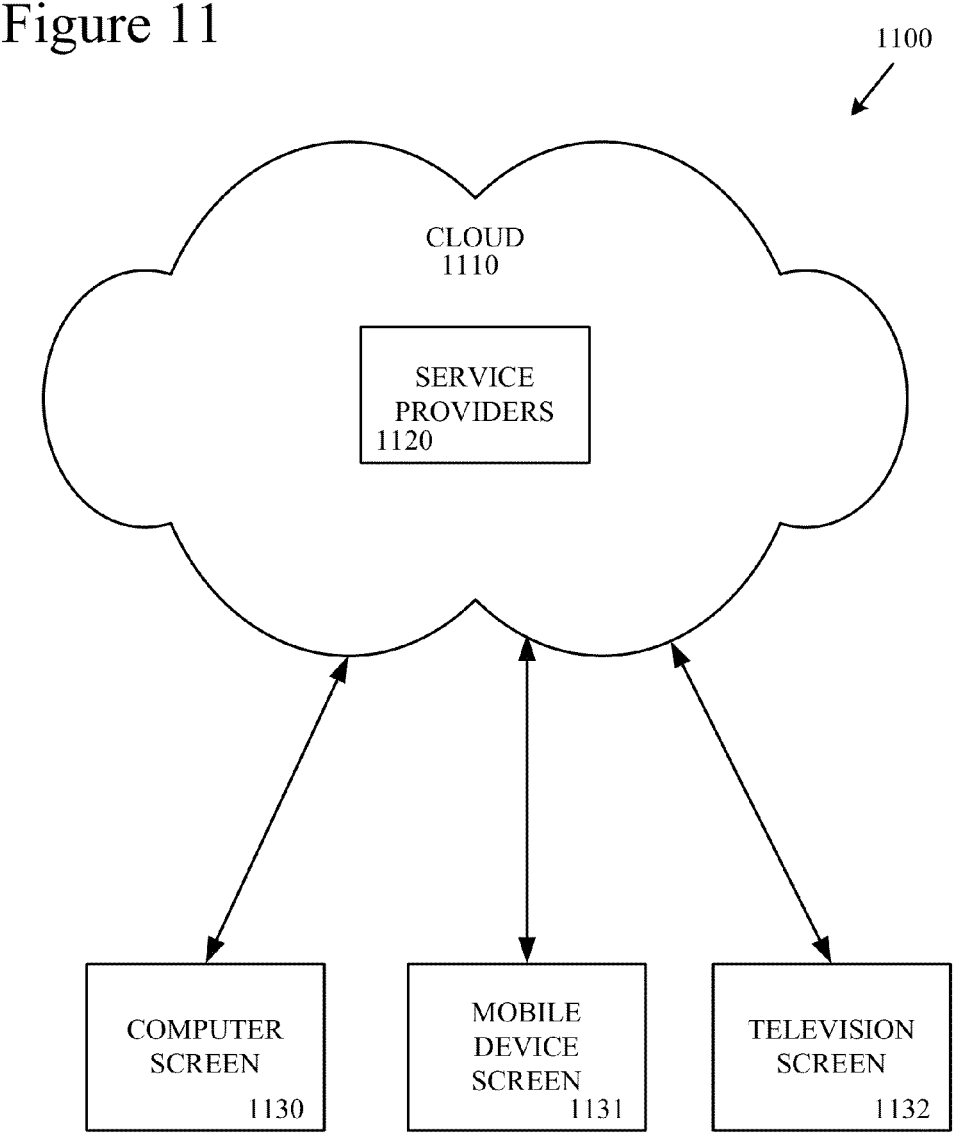
FIG. 11 is a diagram illustrating an example network environment in conjunction with which techniques and tools described herein may be implemented.

FIG. 11 illustrates a generalized example of a suitable implementation environment (1100) in which described embodiments, techniques, and technologies may be implemented. In example environment (1100), various types of services (e.g., computing services) are provided by a computing "cloud" (1110). For example, the cloud (1110) can comprise a collection of computing devices, which may be located centrally or distributed, that provide cloud-based services to various types of users and devices connected via a network such as the Internet. The implementation environment (1100) can be used in different ways to accomplish computing tasks. For example, some tasks (e.g., processing user input and presenting a user interface) can be performed on local computing devices (e.g., connected devices (1130)-(1132)) while other tasks (e.g., storage of data to be used in subsequent processing) can be performed in the cloud (1110).

In example environment (1100), the cloud (1110) provides services for connected devices (1130)-(1132) with a variety of screen capabilities. Connected device (1130) represents a device with a computer screen (e.g., a mid-size screen). For example, connected device (1130) could be a personal computer such as desktop computer, laptop, notebook, netbook, or the like. Connected device (1131) represents a device with a mobile device screen (e.g., a small size screen). For example, connected device (1131) could be a mobile phone, smart phone, personal digital assistant, tablet computer, and the like. Connected device (1132) represents a device with a large screen. For example, connected device (1132) could be a television screen (e.g., a smart television) or another device connected to a television (e.g., a set-top box or gaming console) or the like. One or more of the connected devices (1130)-(1132) can include touch screen capabilities. Devices without screen capabilities also can be used in example environment (1100). For example, the cloud (1110) can provide services for one or more computers (e.g., server computers) without displays.

Services can be provided by the cloud (1110) through service providers (1120), or through other providers of online services (not depicted). For example, cloud services can be customized to the screen size, display capability, and/or touch screen capability of a particular connected device (e.g., connected devices (1130)-(1132)). The service providers (1120) can provide a centralized solution for various cloud-based services. The service providers (1120) can manage service subscriptions for users and/or devices (e.g., for the connected devices (1130)-(1132) and/or their respective users).

In example environment (1100), the 3D map navigation techniques and solutions described herein can be implemented with any of the connected devices (1130)-(1132) as a client computing device. Similarly, any of various computing devices in the cloud (1110) or for a service provide (1120) can perform the role of server computing device and deliver map metadata to the connected devices (1130)-(1132).

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing device that comprises memory and a processing unit, the computing device being adapted to perform a method of rendering map views for map navigation, the method comprising, with the computing device:

determining a first viewer position, the first viewer position being associated with a view altitude in 3D space;

determining a first map metadata element with a first metadata altitude in the 3D space, wherein the first map metadata element is associated with a first feature of a map;

determining a second map metadata element with a second metadata altitude in the 3D space, wherein the second map metadata element is associated with a second feature of the map, and wherein the second metadata altitude is different than the first metadata altitude;

rendering for display a first view of the map based at least in part upon the first viewer position and layering of the first and second map metadata elements in the 3D space at the different metadata altitudes, wherein the rendering the first view depends at least in part on relation of the view altitude of the first viewer position to the different metadata altitudes of the first and second map metadata elements in the 3D space;

determining a second viewer position based at least in part upon input that indicates a change in viewer position; and rendering for display a second view of the map based at least in part upon the second viewer position and layering of the first and second map metadata elements in the 3D space at the different metadata altitudes, wherein the rendering the second view depends at least in part on relation of view altitude of the second viewer position to the different metadata altitudes of the first and second map metadata elements in the 3D space, wherein, compared to the first view, in the second view due to parallax effects the first map metadata element is displaced a different distance than the second map metadata element to account for change between the first viewer position and the second viewer position in the 3D space, and wherein the metadata altitudes and/or scale of the first and second map metadata elements are adjusted for the rendering so as to avoid abrupt displacements in the parallax effects, while maintaining relative ordering and relative distance for the first and second map metadata elements.

2. The computing device of claim 1 wherein the first and second map metadata elements are map metadata text labels that indicate one or more of titles, distances and details about the first and second features on the map, respectively, and wherein a surface layer includes the first and second features of the map.

3. The computing device of claim 1 wherein the rendering the first view of the map comprises:

placing in the 3D space the first and second map metadata elements above the first and second features, respectively, the first and second map metadata elements being placed at the respective metadata altitudes of the first and second map metadata elements; and creating the first view of the map from points of a surface layer and points of the first and second map metadata elements that are visible from the first viewer position.

4. The computing device of claim 1 wherein the first viewer position is associated with a first geographical position, the view altitude of the first viewer position being above the first geographical position in the 3D space, wherein the second viewer position is associated with a second geographical position, the view altitude of the second viewer position being above the second geographical position in the 3D space, and wherein the first geographical position is different than the second geographical position and/or the view altitude of the first viewer position is different than the view altitude of the second viewer position.

5. The computing device of claim 1 wherein the method further comprises, with the computing device:

for each of one or more new viewer positions between the first viewer position and the second viewer position:
  determining the new viewer position; and
  rendering for display a new view of the map based at least in part upon the new viewer position and layering of the first and second map metadata elements in the 3D space at the different metadata altitudes, wherein the rendering the new view depends at least in part on relation of view altitude of the new viewer position to the different metadata altitudes of the first and second map metadata elements in the 3D space, and wherein due to the parallax effects the first map metadata element is displaced a different distance than the second map metadata element to account for change to the new viewer position in the 3D space.

6. The computing device of claim 5 wherein the repeated determining and rendering for the one or more new viewer positions provides an effect of smooth scrolling and/or smooth zooming by updating the displacements of the first and second map metadata elements at least four times per second.

7. The computing device of claim 1 wherein, for the first view and the second view, the first and second map metadata elements stay in place in the 3D space above the first and second features marked by the first and second map metadata elements, respectively, but appear to move between the first and second views.

8. A method of facilitating map navigation, the method comprising, with a server computing device:

receiving, from a client computing device, a request for map information, wherein the request indicates one or more search terms;

based at least in part on search results for the one or more search terms and based at least in part on metadata altitude as a level-of-detail control parameter for the search results, determining first and second map metadata elements with different metadata altitudes in 3D space, wherein the first map metadata element is associated with a first feature of a map, wherein the second map metadata element is associated with a second feature of the map, and wherein the first and second map metadata elements are usable to render views of the map depending at least in part on relation of view altitude of viewer position to the different metadata altitudes of the first and second map metadata elements as layered in the 3D space according to their respective metadata altitudes; and sending, to the client computing device, the first and second map metadata elements.

9. The method of claim 8 wherein the request is a first request, wherein the viewer position is a first viewer position, and wherein the determining is also based at least in part on the view altitude of the first viewer position in the 3D space, the method further comprising, with the server computing device:

receiving, from the client computing device, a second request for map information for the map;

determining one or more additional map metadata elements based at least in part on view altitude of a second viewer position in the 3D space; and sending, to the client computing device, the one or more additional map metadata elements.

10. The method of claim 8 wherein the first and second map metadata elements are map metadata text labels that indicate one or more of titles, distances and details about the features on the map, and wherein a surface layer includes the first and second features of the map.

11. The method of claim 8 wherein the request further includes the view altitude of the viewer position in the 3D space.

12. One or more computer-readable media storing computer-executable instructions for causing a computing device programmed thereby to perform a method of rendering views of a map using map metadata elements layered at different metadata altitudes in 3D space, the one or more computer-readable media comprising a nonvolatile memory component, the method comprising:

determining a first map metadata element with a first metadata altitude in the 3D space, wherein the first map metadata element is associated with a first feature of a map;

determining a second map metadata element with a second metadata altitude in the 3D space, wherein the second map metadata element is associated with a second feature of the map, and wherein the second metadata altitude is different than the first metadata altitude; and for each of one or more viewer positions between an initial viewer position and a destination viewer position:

determining the viewer position, the viewer position being associated with a view altitude in the 3D space; and rendering for display a view of the map based at least in part upon the viewer position and layering of the first and second map metadata elements in the 3D space at the different metadata altitudes, wherein the first map metadata element is a map metadata text label, and wherein:

as the view altitude of the viewer position decreases and approaches a target altitude in the 3D space or target distance, the label becomes larger and sharper from view to view; and as the view altitude of the viewer position further decreases below the target altitude in the 3D space or target distance, the label becomes larger but fades from view to view.

13. The one or more computer-readable media of claim 12 wherein the first and second map metadata elements are placed in the 3D space above the first and second features, respectively, at the metadata altitudes indicated for the first and second map metadata elements, respectively, wherein the rendering the view comprises creating the view of the map from points of a surface layer and points of the first and second map metadata elements that are visible from the viewer position, and wherein determination of which points of the surface layer are visible and which points of the first and second map metadata elements are visible varies depending on perspective of the viewer position.

14. The one or more computer-readable media of claim 12 wherein the second map metadata element is a second map metadata text label, and wherein:

as view altitude of viewer position further decreases and approaches the metadata altitude associated with the second label in the 3D space, the second label rotates from view to view; and at the metadata altitude associated with the second label in the 3D space, the second label flips.

15. One or more computer-readable media storing computer-executable instructions for causing a computing device programmed thereby to perform a method of rendering map views for map navigation, the one or more computer-readable media comprising a nonvolatile memory component, the method comprising, with the computing device:

determining a first viewer position, the first viewer position being associated with a view altitude in 3D space;

determining a first map metadata element with a first metadata altitude in the 3D space, wherein the first map metadata element is associated with a first feature of a map;

determining a second map metadata element with a second metadata altitude in the 3D space, wherein the second map metadata element is associated with a second feature of the map, and wherein the second metadata altitude is different than the first metadata altitude;

rendering for display a first view of the map based at least in part upon the first viewer position and layering of the first and second map metadata elements in the 3D space at the different metadata altitudes, wherein the rendering the first view depends at least in part on relation of the view altitude of the first viewer position to the different metadata altitudes of the first and second map metadata elements in the 3D space, and wherein, in the first view, the first map metadata element and the second map metadata element are rendered in substantially parallel orientation in the 3D space to a surface layer of the map;

determining a second viewer position based at least in part upon input that indicates a change in viewer position; and rendering for display a second view of the map based at least in part upon the second viewer position and layering of the first and second map metadata elements in the 3D space at the different metadata altitudes, wherein the rendering the second view depends at least in part on relation of view altitude of the second viewer position to the different metadata altitudes of the first and second map metadata elements in the 3D space, and wherein, in the second view, the first map metadata element is rendered in substantially perpendicular orientation in the 3D space to the surface layer of the map.

16. The one or more computer-readable media of claim 15 wherein the first and second map metadata elements are map metadata text labels that indicate one or more of titles, distances and details about the first and second features on the map, respectively, and wherein the surface layer includes the first and second features of the map.

17. The one or more computer-readable media of claim 15 wherein the rendering the first view of the map comprises:

placing in the 3D space the first and second map metadata elements above the first and second features, respectively, the first and second map metadata elements being placed at the respective metadata altitudes of the first and second map metadata elements; and creating the first view of the map from points of a surface layer and points of the first and second map metadata elements that are visible from the first viewer position.

18. The one or more computer-readable media of claim 15 wherein the first viewer position is associated with a first geographical position, the view altitude of the first viewer position being above the first geographical position in the 3D space, wherein the second viewer position is associated with a second geographical position, the view altitude of the second viewer position being above the second geographical position in the 3D space, and wherein the first geographical position is different than the second geographical position and/or the view altitude of the first viewer position is different than the view altitude of the second viewer position.

19. The one or more computer-readable media of claim 15 wherein, in the second view, the second map metadata element is rendered in substantially parallel orientation in the 3D space to the surface layer and above the second viewer position.

20. The one or more computer-readable media of claim 15 wherein the method further comprises, with the computing device:
- rendering for display a photographic view of the first feature of the map along with text details pertaining to the first feature, wherein sample values of portions of the photographic view are modified to highlight the first feature within the photographic view.

\* \* \* \* \*